Nov. 12, 1968   H. LARSSON   3,409,933
MACHINE FOR REMOVING LEAVES AND OTHER DEBRIS FROM THE GROUND
Filed May 18, 1966

3,409,933
MACHINE FOR REMOVING LEAVES AND OTHER DEBRIS FROM THE GROUND
Harry Larsson, Hult, Tenhult, Sweden, assignor to Aktiebolaget Huluforsverken, Norrahammar, Sweden, a joint-stock company of Sweden
Filed May 18, 1966, Ser. No. 551,120
3 Claims. (Cl. 15—364)

ABSTRACT OF THE DISCLOSURE

A wheeled machine for removing leaves from the ground in which the underside of the machine is provided with an intake opening limited at the rear in relation to the direction of movement by a rotatable brush for throwing leaves toward the opening. An impeller is positioned in the opening with its shaft parallel to the brush and provided with blades swingable about shafts parallel to and arranged around the impeller shaft. A downwardly hanging plate is located in front of the opening and a pressure roller capable of vertical movement is arranged forward of the plate.

---

The invention relates to a machine for removing or collecting leaves and other debris. An object of this invention is to provide a machine adapted to remove leaves and other debris from the ground. The leaf removing machine is provided on its underside or bottom with a rotating brush having its shaft extending transverse to the direction of movement of the machine together with a suction fan for drawing in the leaves through an intake opening with the pan being carried by a transverse shaft and having an axial extent substantially corresponding to that of the intake opening, a transverse pressure roller mounted in bearings in front of the intake opening for pressing down the leaves before reaching the intake opening and the rotating brush being situated behind the intake opening and so connected to a motor that the lower portion of the brush being moved toward the intake opening will direct those leaves which are left on the ground by the suction fan toward the intake opening.

Further objects and advantages of the invention will become more readily apparent to persons skilled in the art from the following detailed description and annexed drawing, in which.

Figure 1:
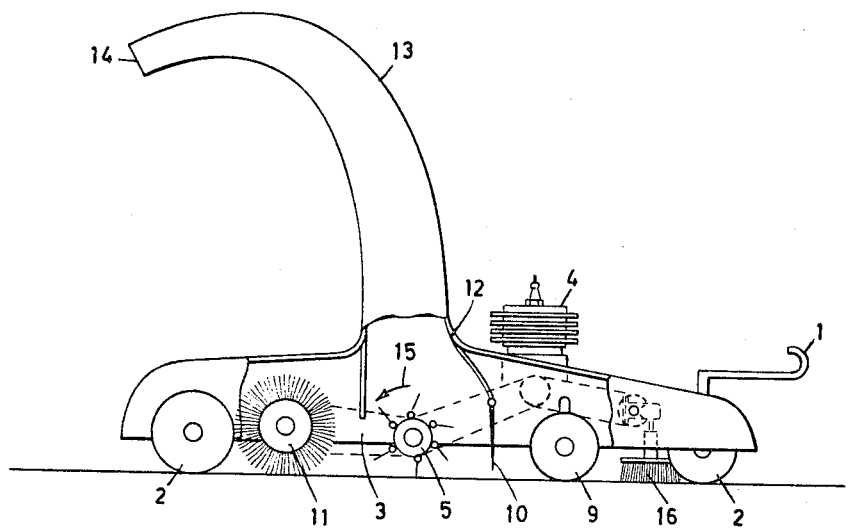
FIG. 1 is a view in side elevation and partly broken away of the invention.
Figure 2:
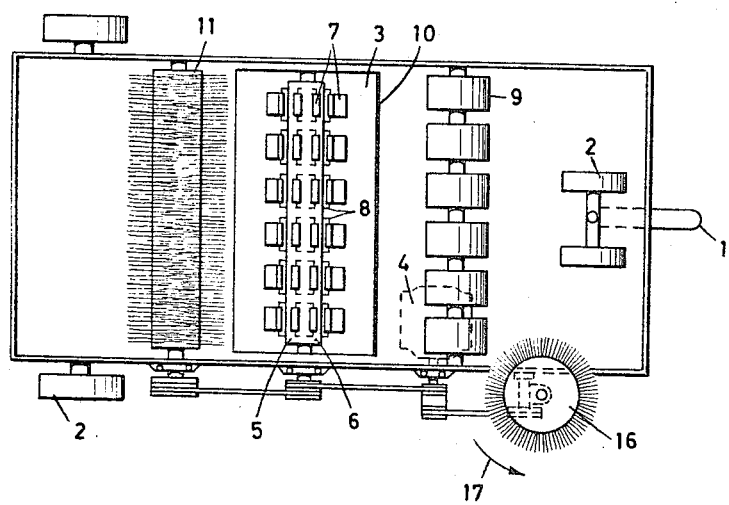
FIG. 2 is a bottom plan view of the machine.

The machine includes a housing supported by ground wheels 2 and a front tow hook 1 can be connected to a suitable towing means, such as a tractor for moving the machine along the ground. On its underside the housing is provided with a generally rectangular intake opening 3 for leaves and other debris, and a suction fan 5 is arranged in the opening and is adapted to be driven by a motor 4 mounted on the housing. The fan is provided with a horizontal shaft 6 which extends transversely of the housing and as shown in FIGURE 2 the length of the fan substantially corresponds to the length of the intake opening. The fan may be provided with blades 7 which are flexible or swingable about shafts 8 arranged in parallelism to the shaft 5.

A pressure roller 9 is located in front of the intake opening and its transverse shaft is mounted in bearings in the housing in such a manner that the pressure roller is vertically movable in the machine. At the front, the intake opening 3 is limited by a downwardly hanging plate 10 behind the pressure roller, and the plate is preferably made of rubber or other soft material.

A rotatable brush 11 has its transverse shaft carried in bearings in the housing behind the intake opening and is driven by the motor 4 in such a way that the portions of the brush located under the shaft are moved forwardly toward the intake opening.

A cap or the like 12 surrounds the fan 5 and terminates in a conveyor pipe 13 provided with a discharge mouth 14 so situated that the collected material will be delivered behind the machine or deposited in a container carried by the machine housing.

During use, the machine is towed along the ground or surface by means of a tractor or other means and the motor 4 rotates the suction fan 5 and the rotating brush 11 in the same direction as denoted by the arrow 15. Hence the leaves as collected will be thrown upwardly through the pipe 13 and the downwardly hanging plate 10 prevents the leaves from being thrown forwardly. Piles of leaves and large leaves will be pressed down by the pressure roller 9 before the leaves are reached by the intake opening 3 and consequently be prevented from being collected in front of the downwardly hanging plate 10. Any leaves possibly remaining on the ground will be thrown forwardly by the brush 11 against the fan 5 and drawn upwardly by the action thereof.

A disk shaped brush 16 may be arranged at one side of the casing on a generally vertically directed shaft and is adapted to be driven in the direction of the arrow 17, so that leaves from the side will be thrown under the pressure roller 9. A corresponding brush may be arranged near the other end of the pressure roller.

While the machine illustrated is towable, it can be so modified that it is self-driven, and in which case the motor 4 can be suitably connected to any of the ground wheels 2 (not shown).

The invention is not to be confined to any strict conformity to the showings in the drawings but changes or modifications may be made therein so long as such changes or modifications mark no material departure from the spirit and scope of the appended claims.

I claim:

1. A machine for removing leaves and other debris from the ground, comprising a housing, ground wheels supporting the housing, the underside of the housing having an inlet opening extending transversely of the housing relative to the direction of movement of the machine, a power driven rotatable brush mounted in the housing and limiting the rear of the inlet opening for throwing leaves toward the inlet opening, an impeller arranged in the inlet opening, a shaft for the impeller journalled in the housing in parellelism to the rotatable brush, shafts arranged around the impeller shaft in parallelism thereto, blades swingable about the shafts, a downwardly hanging plate positioned in front of the inlet opening, and a pressure roller capable of vertical movement mounted in the housing in front of the downwardly hanging plate for pressing down the leaves before being reached by the intake opening.

2. The machine as claimed in claim 1 in which said impeller defines a suction fan.

3. The machine as claimed in claim 1 including a power driven disk brush rotatable about a vertical axis mounted on the housing forward of and adjacent one end of the roller for directing leaves at the side of the machine under the roller.

References Cited

UNITED STATES PATENTS

| | | | |
|---|---|---|---|
| 2,482,166 | 9/1949 | Gage | 15—364 |
| 2,913,744 | 11/1959 | Gregersen | 15—340 XR |
| 3,222,706 | 12/1965 | Kaar et al. | 15—340 |
| 3,229,320 | 1/1966 | Cymara | 15—79 |

FOREIGN PATENTS 529,428   6/1955   Italy.

ROBERT W. MICHELL, *Primary Examiner.*